US008460833B2

(12) United States Patent
Yang et al.

(10) Patent No.: US 8,460,833 B2
(45) Date of Patent: Jun. 11, 2013

(54) OPEN TYPE FUEL CELL SYSTEM WITH UNREACTED MATERIAL REMOVING FUNCTION

(75) Inventors: Cheol Nam Yang, Seoul (KR); Chang Rae Lee, Seoul (KR)

(73) Assignee: Korea Institute of Machinery & Materials, Daejeon (KR)

( * ) Notice: Subject to any disclaimer, the term of this patent is extended or adjusted under 35 U.S.C. 154(b) by 434 days.

(21) Appl. No.: 12/884,307

(22) Filed: Sep. 17, 2010

(65) Prior Publication Data

US 2011/0311890 A1    Dec. 22, 2011

(30) Foreign Application Priority Data

Jun. 18, 2010   (KR) ........................ 10-2010-0057833

(51) Int. Cl.
    *H01M 8/06*   (2006.01)
    *H01M 8/04*   (2006.01)

(52) U.S. Cl.
    USPC ............................ 429/414; 429/413; 429/450

(58) Field of Classification Search
    USPC ........................................ 429/413, 414, 450
    See application file for complete search history.

(56) References Cited

FOREIGN PATENT DOCUMENTS

| JP | 2008251312 A | * | 10/2008 |
|----|--------------|---|---------|
| KR | 10-2003-0021601 | * | 10/2004 |
| KR | 10-2009-0046382 | * | 10/2009 |
| KR | 10-0923447 B1 |   | 10/2009 |

* cited by examiner

*Primary Examiner* — Carlos Barcena
(74) *Attorney, Agent, or Firm* — Saliwanchik, Lloyd & Eisenschenk (57) ABSTRACT

An open type fuel cell system is provided. The fuel cell system can have an unreacted material removing function, including a main fuel cell reacting an oxidant and a reductant to generate electricity, a supply means supplying material containing an oxidant and a reductant for the main fuel cell, a recirculating means recirculating unreacted material, a detector detecting voltages, a regenerating means, a humidification means, an exhausting means, and a controller controlling actions of the supply means, the recirculating means, the detector, the regenerating means, the humidification means, and the exhausting means.

9 Claims, 5 Drawing Sheets

FIG. 5

OPEN TYPE FUEL CELL SYSTEM WITH UNREACTED MATERIAL REMOVING FUNCTION

CROSS-REFERENCE TO RELATED APPLICATION

The present application claims the benefit under 35 U.S.C. §119 of Korean Patent Application No. 10-2010-0057833, filed Jun. 18, 2010, which is hereby incorporated by reference in its entirety.

BACKGROUND

1. Field of the Invention

The present invention relates to an open type fuel cell system with an unreacted material removing function, including a recirculating means recirculating unreacted material discharged from a main fuel cell into the main fuel cell, a regenerating means for removing moisture produced during the operation of the main fuel cell and impurities contained among re-circulated materials, and an exhausting means for exhausting a reductant, which is a fuel among the unreacted material remnants inside the regenerating means.

2. Description of the Related Art

A fuel cell refers to a system generating electricity through the reaction of an oxidizer and a reductant, which is a fuel (for example, a liquefied natural gas LNG, liquefied petroleum gas LPG, hydrogen, methanol, etc.), and simultaneously producing water and heat as a by-product, resulting in an electricity-generating device having high electric-generating efficiency and where environmentally harmful substances are removed.

And, according to the type of the electrolyte used, there exist a PEMFC (Polymer Electrolyte Membrane Fuel Cell), a DMFC (Direct Methanol Fuel Cell), a PAFC (Phosphoric Acid Fuel Cell), a MCFC (Molt Carbonate Fuel Cell) and a SOFC (Solid Oxide Fuel Cell).

Of such types of fuel cells, PEMFC, PAFC and DMFC are low in operating temperature, which is about 80° C. to 120° C., 190° C. to 200° C., and 25° C. to 90° C., respectively. These have high availability as an electric source of various modes of transportation (for example, automobiles), residential and commercial use and as a portable power source.

Therefore, in order to promote and expand the commercialization of these fuel cells, research attention is focused on the miniaturization and reducing of weight and cost of an entire fuel cell system.

However, since the production of reactants is excessive and supplying gas into a catalyst layer and diffusing proton into a polymer membrane are prohibited due to a plethora of moisture produced within the operating environment of a high-current area inside a fuel cell, a lowering of the performance of fuel cells is observed.

Significantly, a partial cell performance drop on account of uneven water distribution per unit cell existing in a fuel cell makes it difficult to perform a normal operation.

As such, considering that the excessive moisture produced in a fuel cell, flooding is an important factor causing the lowering of reaction efficiency. Because flooding makes the secure operation of fuel cells difficult, it is greatly needed to discharge the excessive moisture out of a fuel cell.

Hence, Korean Intellectual Property Office Registration No. 10-0509818-0000 discloses "a method and an apparatus for performing an internal purge in a fuel cell system."

Briefly referring to the prior-art technology, such a system is configured to detect the voltage of a plurality of cells; purge a moisture and gas mixture, which exist inside a stack, out of the stack using a pressure difference that is achieved by controlling a purge valve and a recirculation pump upon a flooding occurrence; and re-supply moisture and separated gas into the stack.

However, such a prior-art technology encompasses following problems.

Firstly, a fuel purity supplied into a fuel cell fails to reach 100%; and thus, even if moisture and the separated gas are re-supplied into the fuel cell, in the end, impurities are stocked up inside the fuel cell, lowering generation efficiency.

Also, impurities such as metal ions, and particles of a peripheral apparatus composed of carbon and a fuel cell, constructing a bipolar plate and an electrode, stock up inside a fuel cell, gradually influencing the durability of the fuel cell as well as producing a current leakage inside a cell. This causes shortening or breakage of the fuel cell and produces an enormous repair cost, which seems to be undesirable.

Also, if recirculating gas inside a fuel cell and removing inside moisture produced in the fuel cell using a conventional technology, a closed circuit is constructed. In the end, impurities are flowed into the fuel cell again through the gas supplied into the fuel cell, lowering the performance and durability of fuel cells.

On the other hand, in the case of a general open-type fuel cell system unequipped with an interior purge, there is a need for a cautious long-time operation in a poorly ventilated or sealed space due to the explosion hazard of fuel such as unreacted hydrogen, discharged into the open air from the fuel cell.

BRIEF SUMMARY

To solve such a problem, an object of the present invention is directed to provide an open type fuel cell system with an unreacted material removing function, including a recirculating means recirculating unreacted material discharged from a main fuel cell into the main fuel cell, a regenerating means for removing moisture and impurities produced during an operation of the main fuel cell, and an exhausting means for exhausting unreacted material remnants inside the regenerating means.

Another object of the invention is to provide an open type fuel cell system with an unreacted material removing function that is configured in a way that it would not discharge fuel supplied in the main fuel cell toward the open air.

An open type fuel cell system with an unreacted material removing function of the present invention includes a main fuel cell reacting an oxidant and a reductant to generate electricity, a supply means supplying material containing the oxidant and the reductant for the main fuel cell, a recirculating means recirculating unreacted material discharged from a main fuel cell into the main fuel cell, a detector detecting voltages of a plurality of cells composing the main fuel cell, a regenerating means selectively communicating to one side of the main fuel cell to remove moisture and impurities inside the main fuel cell, a humidification means supplying moisture discharged from the main fuel cell into the main fuel cell, an exhausting means circulating and exhausting inside the regenerating means unreacted material remnant inside the regenerating means, and a controller controlling actions of the supply means, the recirculating means, the detector, the regenerating means, the humidification means, and the exhausting means.

The regenerating means includes a sacrificial fuel cell reacting an oxidant and a reductant, which is an unreacted material provided from the main fuel cell, to generate electricity.

The exhausting means re-circulates unreacted material passed through the sacrificial fuel cell into the sacrificial fuel cell.

The exhausting means includes an exhauster storing or annihilating electricity generated in the sacrificial fuel cell to exhaust fuel inside the sacrificial fuel cell, a collecting pipe guiding unreacted material and impurities coming from the sacrificial fuel cell into the sacrificial fuel cell, a purge pipe branching from the collecting pipe and selectively opening the inner part of the sacrificial fuel cell, a pressure gauge measuring pressure inside the sacrificial fuel cell, and an ampere meter measuring current amount occurring from the sacrificial fuel cell at one side of the exhauster.

At one side of the collecting pipe, a water collecting part storing water dispensed from the sacrificial fuel cell is provided.

The regenerating means changes a flowing velocity of material unreacted and discharged from the main fuel cell to discharge moisture and impurities inside the main fuel cell through the purge pipe.

The regenerating means includes a regenerating-purpose pipe guiding the flowing direction of unreacted material passing through the main fuel cell, a regenerating-purpose valve selectively shielding the regenerating-purpose pipe, a sacrificial fuel cell reacting unreacted material provided from the regenerating-purpose pipe to produce water, an oxidant influx pipe guiding an oxidant inflow into the sacrificial fuel cell, and a water collecting part collecting water occurring in the sacrificial fuel cell.

The recirculating means includes a gas-liquid separator separating water from unreacted material discharged from the main fuel cell, a recirculating pipe guiding the unreacted material free of water from the gas-liquid separator into the main fuel cell, and a recirculating pump forcing the unreacted material flowing inside the recirculating pipe.

At one side of the collecting pipe, a collecting pump forcing an unreacted material flowing inside the sacrificial fuel cell is provided.

The collecting pump operates when the main fuel cell and the inner part of the sacrificial fuel cell are cut off from each other.

The sacrificial fuel cell has a smaller amount of power generation capacity selectively being replaced.

The purge pipe selectively opens up in a case where the pressure inside the sacrificial fuel cell measured by a pressure gauge is higher than a set pressure.

The purge pipe selectively opens up when current occurring at the sacrificial fuel cell approaches '0' and pressure inside the sacrificial fuel cell increases.

As detailed and described above, an open type fuel cell system with unreacted material removing function according to the present invention includes a recirculating means recirculating unreacted material discharged from a main fuel cell, into the main fuel cell, a regenerating means for removing moisture and impurities produced when electricity generation efficiency of the main fuel cell is lowered, and an exhausting means for exhausting a reductant, which is unreacted material remnants inside the regenerating means.

Thus, the present invention offers benefit of maximizing fuel efficiency and electricity generation efficiency of a main fuel cell by an action of its regenerating means.

Also, the present invention is configured to selectively replace a sacrificial fuel cell provided in a regenerating means.

Thus, by selectively regenerating and enhancing electricity generation efficiency of the main fuel cell when this is lowered, a benefit of improving the durability of a main fuel cell is provided.

And, by being configured to selectively replace a sacrificial fuel cell, the maintenance of a main fuel cell is made easy and the maintainability of the sacrificial fuel cell can be improved.

Also, by exhausting all reductants, which are remnants possibly in a un-reacted state, in a regenerating means using an exhausting means, a benefit of inhibiting an unexpected accident such as explosion and enhancing security is provided.

BRIEF DESCRIPTION OF THE DRAWINGS

The above and other aspects, features and advantages of the present invention will be more apparent from the following detailed description taken in conjunction with the accompanying drawings, in which.

DESCRIPTION FOR KEY ELEMENTS IN THE DRAWINGS

100: OPEN TYPE FUEL CELL SYSTEM
110: MAIN FUEL CELL
112: DRAINAGE CANAL
120: SUPPLYING MEANS
124: FUEL TANK
126: AIR SUPPLIER
130: RECIRCULATING MEANS
131: GAS-LIQUID SEPARATOR
131B: GAS-LIQUID SEPARATOR
133: RECIRCULATING PIPE
137: RECIRCULATING PUMP
140: DETECTOR
150: REGENERATING MEANS
151: OXIDANT INFLUX PIPE
152: REGENERATING-PURPOSE PIPE
153: CHECK VALVE
154: REGENERATING-PURPOSE VALVE
155: INFLUX BLOCKING VALVE
156: SACRIFICIAL FUEL CELL
158: WATER COLLECTING PART
159: $2^{ND}$ EXHAUST PART
160: CONTROLLER

170: HUMIDIFIER
172: $1^{ST}$ EXHAUST PART
175: HUMIDIFYING MEANS
176: HUMIDIFYING-PURPOSE PIPE
177: HUMIDIFYING CONTROL VALVE
180: WATER STORAGE TANK
182: WATER LEVEL ADJUST PIPE
184: ADJUST VALVE
190: DRAIN PART
192: DRAIN PIPE
194: DRAIN VALVE
200: EXHAUSTING MEANS
210: EXHAUSTER
212: EXHAUSTING PART
214: CAPACITOR
216: CAPACITOR SWITCH
220: SHORT-CIRCUIT SWITCH
230: COLLECTING PIPE
232: PURGE VALVE
240: PURGE PIPE
250: PRESSURE GAUGE
260: AMPEREMETER
270: COLLECTING PUMP

DETAILED DESCRIPTION

Hereinafter, a construction of an open type fuel cell system with an unreacted material removing function according to the present invention will be described with reference to the accompanying drawings.

And, an embodiment of the present invention will be explained by applying oxygen-containing air as an oxidant and by applying hydrogen as a reductant.

Figure 1:
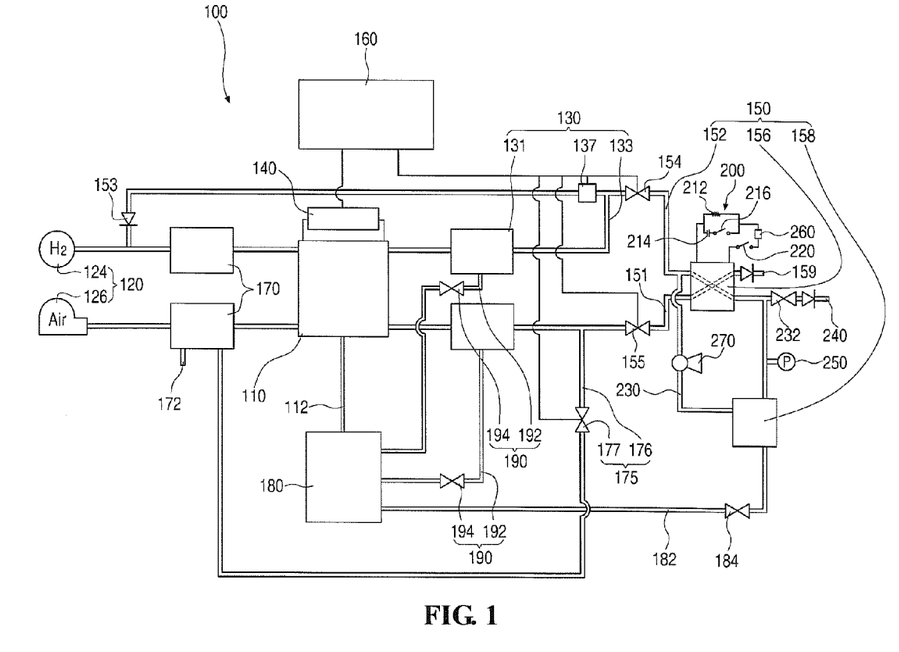
FIG. 1 is a diagram showing a construction of an open type fuel cell system according to the present invention.

FIG. 1 shows a diagram showing a construction of an open type fuel cell system according to the present invention.

The open type fuel cell system 100 refers to a system applicable to an apparatus used in an air exposed space such as automobiles, configured to generate power by supplying hydrogen and air and dispense moisture and air.

Thus, a main fuel cell 110 using various fuel cells may be selectively applicable within a range of producing electricity when being supplied with an oxidant (oxygen) and a reductant (hydrogen), which is fuel.

As shown in the figure, an open type fuel cell system 100 refers to a system generating electricity by reacting an oxidant and a reductant, where fuel, which is hydrogen ($H_2$), is applied as a reductant and oxygen-containing air is applied as an oxidant.

And, the open type fuel cell system 100 is configured to generate electricity by recirculating unreacted material containing a reductant and an oxidant discharged but not exhausted in producing electric power, and store the generated electricity or exhaust it into heat to completely remove unreacted material.

To do this, the open type fuel cell system 100 includes a main fuel cell 110 reacting an oxidant and a reductant to generate electricity, a supply means 120 supplying hydrogen and the air for the main fuel cell 110, a recirculating means 130 recirculating material containing unreacted hydrogen discharged from a main fuel cell 110 into the main fuel cell 110, a detector 140 detecting voltages of a plurality of cells comprising the main fuel cell 110, a regenerating means 150 selectively communicating to one side of the main fuel cell 110 to remove moisture and impurities inside the main fuel cell 110, a humidification means 175 supplying moisture among the air discharged from the main fuel cell 110 into the main fuel cell 110, an exhausting means 200 circulating and exhausting inside the regenerating means 150 hydrogen remnant inside the regenerating means 150, and a controller 160 controlling actions of the supply means 120, the recirculating means 130, the detector 140, the regenerating means 150, the humidification means 175, and the exhausting means 200.

The supplying means 120 is configured to supply gas containing hydrogen and oxygen for the main fuel cell 110, and, in one embodiment of the present invention, includes a fuel tank 124 stocking and selectively supplying hydrogen and an air supplier 126 supplying external air into the main fuel cell 110.

As the air supplier 126, an air blower or an air compressor may be applied to inhale the external air and supply it strongly to the main fuel cell 110.

The aforementioned open type fuel cell system 100 may be installed and applied in an apparatus used in a condition or environment that is open to outside air, such as automobiles, wherein the air supplied by the air supply 126 is provided into the main fuel cell 110 and wherein only hydrogen is reacted while the remaining gas exits out of the main fuel cell 110.

The fuel tank 124 and the air supplier 126 communicate to a humidifier 170, and the humidifier 170 communicates to the inner part of the main fuel cell 110. Thus, hydrogen and the air inside the fuel tank 124 and the air supplier 126 may be humidified by the humidifier 170 and then supplied into the main fuel cell 110.

The humidifier 170 is configured to react fuel ($H_2$) and the air supplied into the main fuel cell 110 more easily. The humidifier 170 connected to the air supplier 126 has a first exhaust part 172 at its bottom side.

The first exhaust part 172 is configured to dispense damp air influx into the humidifier 170 by a humidifying means 175 and pass it through the humidifier 170 to the outside.

On the upper side of the main fuel cell 110, a detector 140 is provided. The detector 140 is configured to detect voltages of a plurality of cells composing the main fuel cell 110.

That is, the main fuel cell 110 is configured to generate high voltage by stacking a plurality of cells, which on the other hand, generates a different voltage depending on the amount of moisture that occurs inside a cell and changes in current density according to the length of time of use, thereby causing differences between cells.

Thus, a detector 140 used for measuring moisture amount and the current density change for in-advance monitoring while operating the main fuel cell 110 is provided.

At the right side of the detector 140, a recirculating means 130 is provided. The recirculating means 130 is configured to recirculate hydrogen discharged but unreacted inside a main fuel cell 110 into the main fuel cell 110 to maximize availability of fuel.

To do this, the recirculating means 130 includes a gas-liquid separator 131 separating the unreacted material (gaseous state) containing water and hydrogen produced by a reaction of hydrogen and oxygen inside a main fuel cell 110, a recirculating pipe 133 guiding separated material to contain hydrogen in large amount by the gas-liquid separator 131 into a main fuel cell 110, and a recirculating pump 137 forcing a gas flow inside the recirculating means 130.

The recirculating means 130 is installed to communicate both of its parts to the inner part of a gas-liquid separator 131 and the fore-end of a humidifier 170, so that unreacted material (hydrogen and other impurities) exiting from the main fuel cell 100 can be recirculated again into the main fuel cell 110.

At one side of the recirculating means 130, a check valve 153 is provided. The check valve 153 blocks the reductant (hydrogen) supplied from a fuel tank 124 to inhibit it from influxing a recirculating pipe 133, and forces recirculating gas (hydrogen) supplied into the fore-end of a main fuel cell 110 by the recirculating pump 137 to inflow inside a humidifier 170.

In the meantime, a function of the check valve 153 may be configured to be performed by various modified embodiments.

That is, a hydrogen influx supplied from a fuel tank 124 can be shut off by a capillary phenomenon resulting from the removal of the check valve 153 from the recirculating pipe 133; and the differentiating thicknesses of a part connecting the fuel tank 124 and the humidifier 170, and a part where a check valve 153 is placed.

More particularly, by configuring a pipe thickness of a part where the check valve 153 is placed more thinly and by having a capillary phenomenon occur when the fuel tank 124 supplies fuel to the right side, the function of the check valve 153 can be executed, and it can be configured to replace a recirculating function by triggering a gas flow into the main fuel cell 110.

And, at the lower side of the gas-liquid separator 131, a drain part 190 is provided. The drain part 190 is configured to guide water to be dispensed into a water storage tank 180 when water dispensed from a main fuel cell 110 increases and exceeds the proper water level inside a gas-liquid separator 131.

To this end, the drain part 190 includes a drain pipe 192 communicating the inner part of a gas-liquid separator 131 and the inner part of a water storage tank 180, and a drain valve 194 selectively shielding the inner part of the drain pipe 192.

Thus, water inside the gas-liquid separator 131 may be influxed through a drain pipe 192 to a water storage tank 180, which will be controlled by the open/closing of the drain valve 194 so that the water level inside the gas-liquid separator 131 is maintained constantly.

At the right side of the recirculating means 130, a regenerating means 150 is provided. In case when voltage of a plurality of cells of a main fuel cell 110 detected by a detector 140 is lower than a set voltage, the regenerating means 140 is configured to discharge impurities inside the main fuel cell 110 into the outside by instantly bypassing gas influxed inside a recirculating pipe 133.

To this end, the regenerating means 150 includes a regenerating-purpose pipe 152 guiding the flowing direction of the unreacted material passing through the recirculating means 130, a regenerating-purpose valve 154 selectively shielding the regenerating-purpose pipe 152, a sacrificial fuel cell 156 producing water by reacting inside air and reductant (hydrogen) provided from the regenerating-purpose pipe 152, and a collecting part 158 collecting water from the sacrificial fuel cell 156.

The regenerating-purpose pipe 152 branches from one side of a recirculating pipe 133 and connects to the inner part of a sacrificial fuel cell 156, guiding a gas flowing by means of the operation of the regenerating-purpose valve 154.

Thus, the sacrificial fuel cell 156 may be supplied with unreacted material (hydrogen) dispensed from the main fuel cell 110 at the opening of a regenerating-purpose valve 154.

As can be known from the name of the configuration, the sacrificial fuel cell 156 selectively operates when the main fuel cell 110 performance is lowered due to inner part moisture or when it intends to discharge impurities. It has small amount of electricity generation capacity as compared with the main fuel cell 110, and is configured to be selectively replaced.

That is, the sacrificial fuel cell 156 may be supplied with unreacted material, which is hydrogen and air, for electricity generation. At one side of a pair of electrodes guiding the flowing electricity, a short-circuit switch 220 is provided for a selective connection. The short-circuit switch 220 is one configuration of an exhausting means 200 as specifically described below. Hydrogen, which is a fuel among the unreacted material dispensed from inside the main fuel cell 110, may be consumed inside a sacrificial fuel cell 156 by connecting the short-circuit switch 220 to the water and other impurities that are stocked up inside a sacrificial fuel cell 156.

And, inside the sacrificial fuel cell 156, the supplied unreacted material may be transformed into water by an electrical connection, and at the same time impurities are absorbed and piled up. Therefore, the sacrificial fuel cell 156 performs a function of piling up small amounts of impurities from a reductant, which is fuel supplied to increase the durability of a main fuel cell 110, and impurities inside a sealed-type fuel cell system.

By doing this, the sacrificial fuel cell 156 protects the main fuel cell 110 and enhances its durability; however, it may be periodically replaced in some cases due to effects of putting it into a severe environment condition.

In the meantime, actions of the detector 140, the recirculating pump 137, the regenerating-purpose valve 154, the short-circuit switch 220, etc. can be controlled by a controller 160.

That is, the controller 160 operates the generating means 150 in a case one or more of each of a plurality of cells is lower than a preset voltage, and in a normal voltage case, operates the recirculating means 130.

More particularly, in a state where the recirculating pump 137 is operated, the regenerating-purpose valve 154 is shielded and the short-circuit switch 220 stays off, the recirculating means 130 may be operated.

On the contrary, in a case where a certain time has elapsed after the regenerating-purpose valve 154 is shielded and the recirculating pump 137 maintains a stop state, pressure inside the recirculating pipe 133 increases. At this time, by operating the regenerating-purpose valve 154, opening a regenerating-purpose pipe 152 and turning a short-circuit switch 220 on, the regenerating means 130 may be operated.

Aside from this, the controller 160 is configured to selectively open a drain valve 194 and adjust a water level according to a water level inside a gas-liquid separator 131.

As described above, the inner part of the gas-liquid separator 131 selectively communicates to a water storage tank 180 by a drain pipe 192, and by a drainage canal provided at one side of the main fuel cell 110, the main fuel cell 110 and the inner part of a water storage tank 180 communicate.

Also, the inner part of the water collecting part 158 communicates to the inner part of a water storage tank 180. That is, at the left side surface of the water collecting part 158, a water level adjust pipe 182 and an adjust valve 184 are provided for a water level adjustment inside a water collecting part 158.

Both end parts of the water level adjust pipe 182 are connected to communicate the water collecting part 158 and the inner part of a water storage tank 180, respectively, and the adjust valve 184 selectively shields the inner part of the water level adjust pipe 182.

Thus, depending on whether the adjust valve 184 is open or not, water inside the water collecting part 158 may be influxed and stocked in the inner part of a water storage tank 180.

Therefore, water inside the main fuel cell 110, water inside a gas-liquid separator 131, and water inside a water collecting part 158 may all be influxed and stocked into the inner part of a water storage tank 180 to install it inside a sealed space.

Meanwhile, at the right side of another gas-liquid separator 131B communicating to a flowing canal that allows flow of air, which is an oxidant inside the main fuel cell 110, an oxidant influx pipe 151 is provided.

The oxidant influx pipe 151 is configured to guide air (oxidant) that is exited from the gas-liquid separator 131B to flux into a sacrificial fuel cell 156.

That is, as the regenerating-purpose pipe 152 provides hydrogen into the sacrificial fuel cell 156, the oxidant influx pipe 151 is configured to provide unreacted material containing an oxidant unreacted and exited from a main fuel cell 110 to a sacrificial fuel cell 156 in order for it to react it with a reductant.

Thus, the oxidant influx pipe 151 may selectively open like the regenerating-purpose pipe 152 in order to regenerate a main fuel cell 110 using the sacrificial fuel cell 156, and to do this, the oxidant influx pipe 151 is provided with an influx blocking valve 155 for selective opening.

At one side of the sacrificial fuel cell 156, a second exhaust part 159 is provided. The second exhaust part 159 is configured to exhaust air, an oxidant material discharged but unreacted inside a sacrificial fuel cell 156, performing a similar function to that of the first exhaust part 172 as described above.

That is, the first exhaust part 172 is where the air, an oxidant, passes through a humidifier 170, the main fuel cell 110, a humidifying-purpose valve 176, and a humidifying control valve 177; again influxes into the humidifier 170 for moisture exchange; and eventually dispenses outside. The second exhaust part 159 is configured to exhaust air, an oxidant from the material, passing through the humidifier 170, the main fuel cell 110, the oxidant influx pipe 151 opened by the influx blocking valve 155, and inside the sacrificial fuel cell 156.

Thus, the first exhaust part 172 and the second exhaust part 159 may selectively operate. More particularly the first exhaust part 172 exhausts during an operation of a humidifying means 175, and the second exhaust part 159 exhausts when an oxidant influx pipe 151 is opened.

That is, the humidifying means 175 includes a humidifying-purpose pipe 176 guiding damp air discharged from the gas-liquid separator 131B again into the humidifier 175, and a humidifying control valve 177 selectively shielding the humidifying-purpose pipe 176.

Meanwhile, around the sacrificial fuel cell 156, an exhausting means 200, which is a main configuration of the present invention, is provided. Because some of the reductant (hydrogen) and the oxidant (oxygen-containing air) supplied into a sacrificial fuel cell 156 may fail to become water but remains as unreacted material, the exhausting means 200 performs a task of re-influxing such unreacted material again into a sacrificial fuel cell 156 for reaction; and thus, exhausting all hydrogen, which is fuel.

And, the exhausting means 200 is configured to store electricity in the process of circulating un-reacted hydrogen inside a sacrificial fuel cell 156.

Also, together with this, the exhausting means 200 performs a function of not generating electricity even if unreacted hydrogen circulates inside a sacrificial fuel cell 156, or of purging foreign substance inside a sacrificial fuel cell 156 when pressure inside a sacrificial fuel cell 156 is over a set pressure.

A configuration of the exhausting means 200 will be described in detail with reference to the accompanying FIG. 2.

Figure 2:
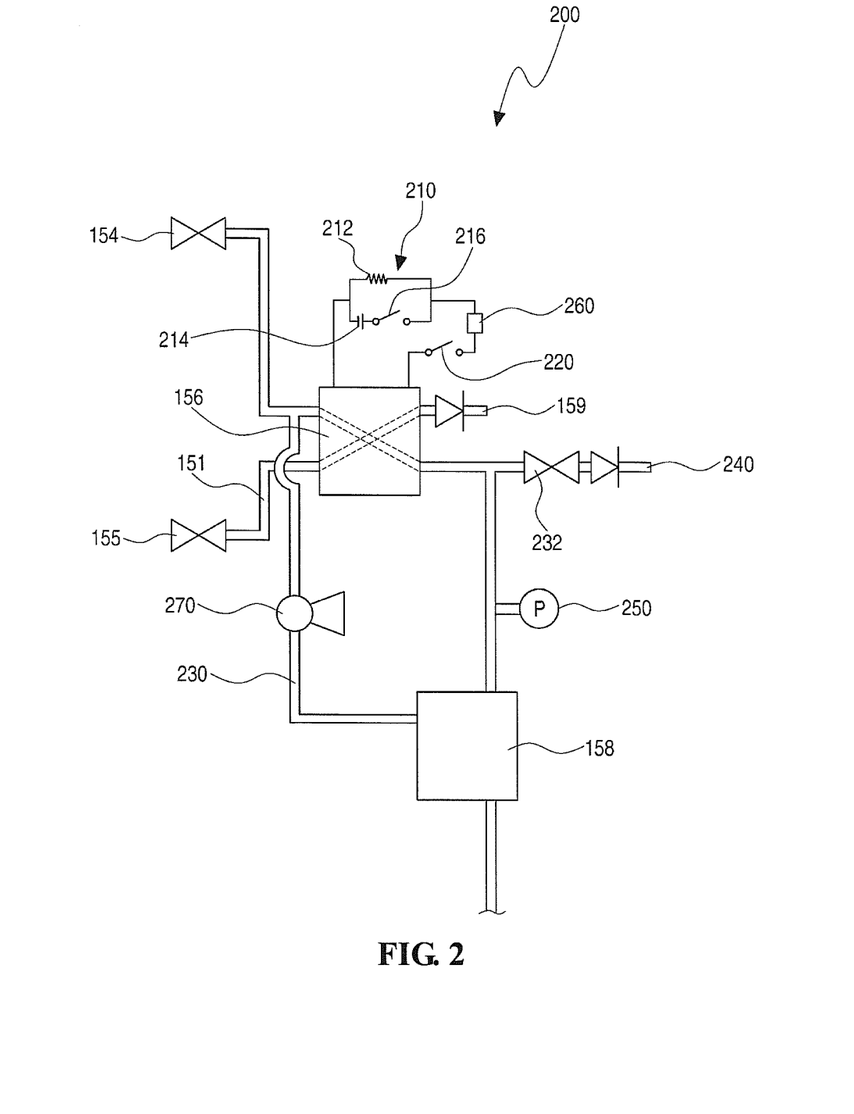
FIG. 2 is a diagram indicating a construction of an exhausting means, which is one construction of an open type fuel cell system according to the present invention.

FIG. 2 shows a diagram indicating a configuration of an exhausting means 200, which is one construction of an open type fuel cell system according to the present invention.

As shown in the figure, the exhausting means 200 includes an exhauster 210 storing or extincting electricity generated in the sacrificial fuel cell 156 to exhaust fuel inside the sacrificial fuel cell 156, the aforementioned short-circuit switch 220, a collecting pipe 230 guiding unreacted material or impurities, etc. coming from the sacrificial fuel cell 156 into the sacrificial fuel cell 156, a purge pipe 240 branching from the collecting pipe 230 and selectively opening the inner part of the sacrificial fuel cell 156, a pressure gauge 250 measuring pressure inside the sacrificial fuel cell 156, and an amperemeter 260 measuring current amount occurring in the sacrificial fuel cell 156 at one side of the exhauster 210.

The exhauster 210 is configured to exhaust hydrogen (a reductant) from the unreacted material inside a sacrificial fuel cell 156 when unreacted material and air are supplied into the sacrificial fuel cell 156, thereby storing an occurring current or exhausting it as heat so that the current occurring inside the sacrificial fuel cell 156 approaches 0.

To this end, the exhauster 210 is provided with a short-circuit switch 220 connected to an electrode of the sacrificial fuel cell 156, and at the upper side of the short-circuit switch 220, an amperemeter 260 may be placed.

And, the short-circuit switch 220 selectively connects to an exhauster 212 and a capacitor 214; the capacitor 214 selectively connects to the sacrificial fuel cell 156 through a capacitor switch 216.

The collecting pipe 230 guides the transfer direction of water and unreacted material dispensed from a sacrificial fuel cell 156, connecting to an input part of the sacrificial fuel cell 156 via the water collecting part 158.

Thus, water among unreacted material and water dispensed from the sacrificial fuel cell 156 is collected at the water collecting part 158, and unreacted material may be influxed and reacted again inside the sacrificial fuel cell 156 along the collecting pipe 230.

At one side of the collecting pipe 230, a pressure gauge 250 is provided to measure pressure inside the sacrificial fuel cell 156, and at the right side of the water collecting part 158 (the left side of a purge pipe 240), a purge valve 232 is provided to selectively open the purge pipe 240. At one side of the collecting pipe 230, a collecting pump 270 is provided.

Thus, when the purge valve 232 is open, impurities and moisture inside the sacrificial fuel cell 156 may be discharged towards the outside through the purge pipe 240, and when the purge valve 232 is closed, a circulation of unreacted material into a collecting pipe 230 may be possible by an action of a collecting pump 270.

The collecting pump 270 is configured to forcibly influx unreacted material inside a sacrificial fuel cell 156 back into it again, and is installed to communicate to the inner part of the collecting pipe 230 in order to coerce the flowing gas.

The purge pipe 240 branches from one side of the collecting pipe 230, selectively opening when an electricity generation is inhibited by the increase of unreacted material inside the sacrificial fuel cell 156.

That is, the purge pipe 240 maintains a closed state when unreacted gas inside a sacrificial fuel cell 156 circulates and exhausts by an action of an exhausting means 200. However, nitrogen gas or the like in the air unused in electricity generation among materials existing inside the sacrificial fuel cell 156 may stay inside the sacrificial fuel cell 156.

As one embodiment, when fuel among unreacted material exhausts by an action of an exhausting means 200 inside a sacrificial fuel cell 156 and also when pressure inside a sacrificial fuel cell 156 increases by other material unusable as fuel among unreacted material passed through a polymer membrane, pressure measured by a pressure gauge 250 increases but current measured by an amperemeter 260 approaches 0. At this time, by selectively opening a purge pipe 240, the remaining material may be discharged.

As another embodiment, to discharge impurities and moisture inside a sacrificial fuel cell 156 towards the outside in a short time, the purge pipe 240 opens at the same time as the regenerating valve 154, an influx blocking valve 155 and a purge valve 232 and receives fuel, which is a reductant, and air, which is an oxidant, of high pressure from the main fuel cell 110, thereby discharging moisture, impurities and material (nitrogen, etc.) accumulated inside a sacrificial fuel cell 156.

Hereinafter, a procedure of generating electricity by operating the open type fuel cell system 100 will be described with reference to arrows of FIG. 3.

Figure 3:
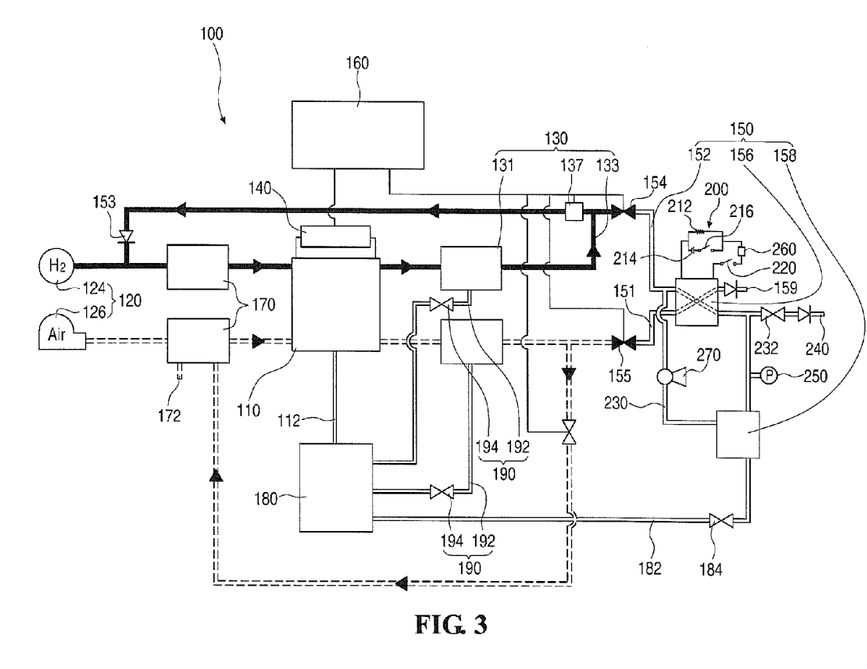
FIG. 3 is an operational state diagram indicating the flow direction of a reductant (hydrogen) and an oxidant (air) upon an operation of a recirculating means, which is one construction of an open type fuel cell system according to the present invention.

FIG. 3 shows an operational state diagram indicating the flow direction of fuel, which is a reductant, and air, which is an oxidant, during the operation of a recirculating means, which is one configuration in an open type fuel cell system according to the present invention.

As shown in the figure, in order for the open type fuel cell system 100 to generate electricity, the supplying means 120 supplies hydrogen, which is a reductant, and air, which is an oxidant, into a humidifier 170. A main fuel cell 110 being supplied air and fuel ($H_2$) humidified through the humidifier 170 generates electricity.

And, unreacted material in the main fuel cell 110 passes through a gas-liquid separator 131 and then flows along a recirculating pipe 133, and unreacted damp air passing through another gas-liquid separator 131B flows into the humidifier 170 where the air is added to moisture, and exhausts through the first exhaust part 172 towards the outside.

At this time, the regenerating-purpose valve 154 shields a regenerating-purpose pipe 152 to block a gas influx, the influx blocking valve 155 shields the oxidant influx pipe 151 to block an air influx, and the detector 140 measures voltages of a plurality of cells composing the main fuel cell 110 continuously. Also, the short-circuit switch 220 stays off.

Thus, recycling of supplied fuel by an action of a recirculating means 130 as described above can be maximized.

Hereinafter, in a case where one or more voltages of each of a plurality of cells detected by the detector 140 becomes lower than the preset voltage, thereby operating the regenerating means 150, a flowing gas will be described with reference to the accompanying FIG. 4.

Figure 4:
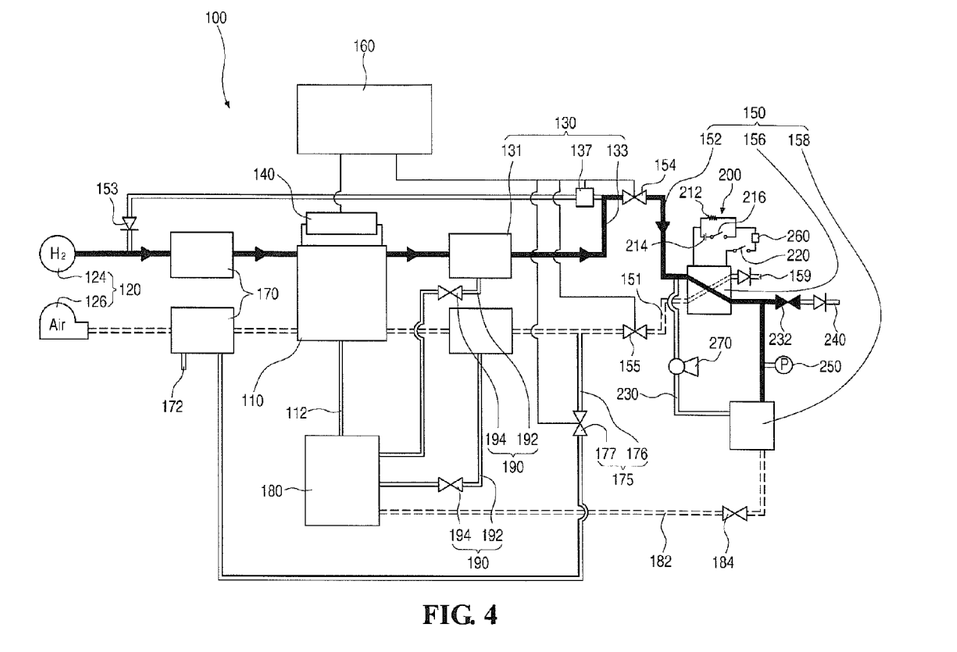
FIG. 4 is an operational state diagram indicating the flow direction of a reductant and an oxidant upon an operation of a regenerating means, which is one construction of an open type fuel cell system according to the present invention.

FIG. 4 shows an operational state diagram indicating the flow direction of fuel and air during the operation of a regenerating means in an open type fuel cell system according to the present invention.

As shown in the figure, as electricity generating efficiency of the main fuel cell 110 lowers, the generating means 150 operates to enhance the electricity generating efficiency and durability of a main fuel cell 110.

To do this, the controller 160 opens a regenerating-purpose valve 154 and discharges moisture inside a main fuel cell 110 by a pressure difference into a gas-liquid separator 131, and at the same time supplies unreacted material and impurities into a sacrificial fuel cell 156.

At this time, by turning the short-circuit switch 220 on and reacting fuel and oxygen in the air, which is an oxidant, inside a sacrificial fuel cell 156, these are transformed into water, wherein the purge pipe 240 stays in a closed state.

Therefore, the sacrificial fuel cell 156 generates electricity, and inside the sacrificial fuel cell 156 water is produced.

Water produced inside the sacrificial fuel cell 156 flows into a water-collecting part 158 and is stocked there, but it can be influxed into the water storage tank 180 by a selective opening of the adjust valve 184.

And, air acting as an unreacted oxidant in the sacrificial fuel cell 156 discharges through a second discharge part 159 towards the outside. The purge valve 232 has closed the purge pipe 240.

According to the described action, water and impurities, etc. inside the main fuel cell 110 accumulate inside the sacrificial fuel cell 156, thereby decreasing the impurities inside a main fuel cell 110 and enhancing its durability in the end.

Also, the sacrificial fuel cell 156 produces water by reacting all fuel, which is a reductant, thereby inhibiting a fuel discharge outward.

Meanwhile, when reacting fuel and air among unreacted material using the sacrificial fuel cell 156 to regenerate a main fuel cell 110, water is produced inside the sacrificial fuel cell 156 and this water and impurities block an electrode reaction site in the sacrificial fuel cell 156; by which, fuel among unreacted materials no longer reacts with air, making it stagnant.

These water and impurities accumulate inside the sacrificial fuel cell 156, preventing a reaction between unreacted material and air from smoothly occurring.

To solve such a problem, by operating a collecting pump 270 of the exhausting means 200 to enhance liquidity of hydrogen, and by shifting water and impurities blocking an electrode reaction site in the sacrificial fuel cell 156, fuel from unreacted material can participate in an electrode reaction.

And, by operating the exhausting means 200, fuel among unreacted material inside the sacrificial fuel cell 156 can completely be exhausted.

That is, by re-influxing unreacted material inside a sacrificial fuel cell 156 again into the sacrificial fuel cell 156 using a collecting pump 270 to operate the exhausting means 200 in order to move fixed moisture and impurities blocking an electrode reaction site inside the sacrificial fuel cell 156, and thereby enhancing reactivity of an electrode inside the sacrificial fuel cell 156 and reacting fuel and air among unreacted material, fuel may completely be exhausted.

Hereinafter, an action of an exhausting means 200 will be described with reference to arrows of the accompanying FIG. 5.

Figure 5:
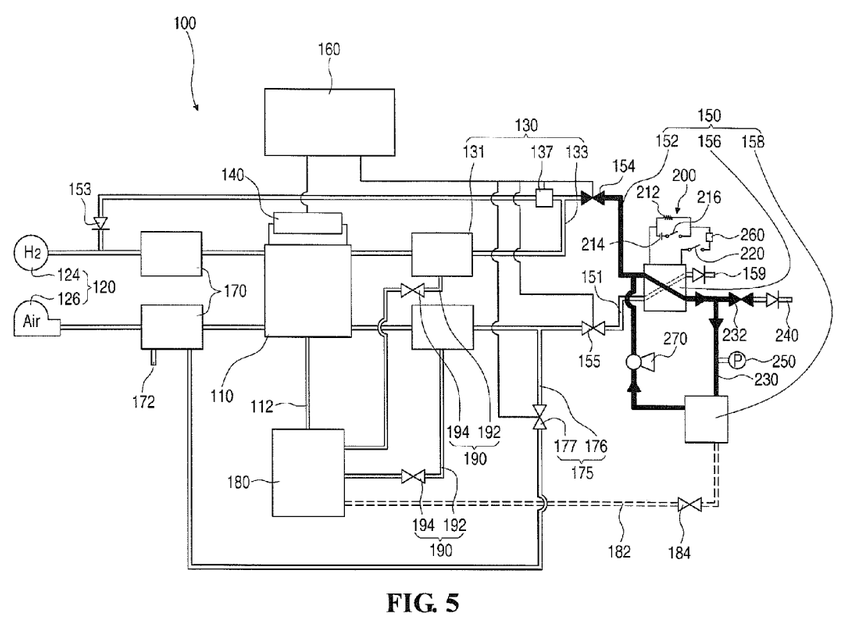
FIG. 5 is an operational state diagram indicating the flow direction of impurities containing water and a reductant, which is unreacted material, upon an operation of an exhausting means, which is one construction of an open type fuel cell system according to the present invention.

FIG. 5 shows an operational state diagram indicating the flow direction of unreacted material during the operation of an exhausting means, which is one construction in an open type fuel cell system according to the present invention.

As shown in the figure, to exhaust fuel among unreacted material inside a sacrificial fuel cell 156 using the exhausting means 200, it is necessary to pass through a procedure of dispensing unreacted material and moisture and impurities and a procedure of re-supplying and exhausting only unreacted material having its moisture removed in large amount through a gas-liquid separator among dispensed material, into a sacrificial fuel cell 156.

For this action, in a state where the regenerating-purpose valve 154 and the influx blocking valve 155 are closed and the purge valve 232 is also closed, the collecting pump 270 operates.

By the operation of the collecting pump 270, unreacted material, impurities and water remnants inside the sacrificial fuel cell 156 shift along a collecting pipe 230; and through a water collecting part 158 large amount of moisture and impurities are filtered, and unreacted material influxes again inside the sacrificial fuel cell 156.

At this time, since the inner part of the sacrificial fuel cell 156 stays partially free of impurities and water, it reacts to air, and the exhauster 210 (see FIG. 2) stores the generated electricity or exhausts the electricity.

That is, as shown in the figure, when the short-circuit switch 220 and the capacitor switch 216 are turned "on", electricity generated inside the sacrificial fuel cell 156 will store into a capacitor 214.

Conversely, when the short-circuit switch 220 stays "on", and a capacitor switch 216 stays "off", the capacitor 214 does not store electricity but the electricity will be exhausted by an exhausting part 212. In an embodiment of the present invention, resistance may be applied to the exhausting part 212.

Meanwhile, when pressure inside the sacrificial fuel cell 156, measured by means of the pressure gauge 250, increases and exceeds the pressure set as gas such as nitrogen gas remnants inside the sacrificial fuel cell 156 becomes stagnant; and when the current value measured in the amperemeter approaches "0", reactivity of the sacrificial fuel cell 156 lowers because fuel among unreacted gas has almost been exhausted even if unreacted material and air are supplied into the sacrificial fuel cell 156.

Thus, to enhance regeneration of the main fuel cell 110 more efficiently, foreign substance and impurities, etc. stagnant inside the sacrificial fuel cell 156 should be discharged.

To do this, the purge pipe 240 opens. More particularly, the pressure of a pressure gauge 250 increases and a reaction inside the sacrificial fuel cell 156 no longer proceeds, a current value measured by an amperemeter 260 approaches "0", and fuel among unreacted material inside the sacrificial fuel cell 156 is almost been exhausted. Therefore, the purge pipe 240 may be opened by a purge valve 232 to discharge stagnant internal gas and impurities.

And, a terminal part of the purge pipe 240 is provided with a check valve, so that material outside a purge pipe 240 could not be influxed inwards.

Meanwhile, intended to discharge stagnant gas and impurities inside the sacrificial fuel cell 156 to the exterior part in a short time, the second discharge part 159 can be simultaneously opened by opening the regenerating valve 154, the influx blocking valve 155 and the purge valve 232.

The scope of the present invention as described above is not limited to exemplified embodiments, and it would be apparent to those skilled in the art that various different changes of the present invention are made within the scope of the invention technology.

What is claimed is:

1. An open type fuel cell system with an unreacted material removing function, comprising:
  a main fuel cell reacting an oxidant and a reductant to generate electricity;
  a means for supplying material including an oxidant and a reductant for the main fuel cell;
  a means for recirculating unreacted material discharged from the main fuel cell into the main fuel cell;
  a detector detecting voltages of a plurality of cells composing the main fuel cell;
  a means for regenerating selectively communicating to one side of the main fuel cell to remove moisture and impurities inside the main fuel cell;
  a means for humidification supplying moisture discharged from the main fuel cell, into the main fuel cell;
  a means for exhausting circulating and exhausting inside the regenerating means unreacted material remnant inside the regenerating means; and
  a controller controlling actions of the means for supplying, the means for recirculating, the detector, the means for regenerating, the means for humidification, and the means for exhausting,
  wherein the means for regenerating includes a sacrificial fuel cell reacting oxidant and reductant from unreacted material provided from the main fuel cell, for electricity generation, and
  wherein the means for exhausting includes:
    an exhauster storing or discharging electricity generated in the sacrificial fuel cell to exhaust fuel inside the sacrificial fuel cell;
    a collecting pipe guiding unreacted material and impurities coming from the sacrificial fuel cell into the sacrificial fuel cell;
    a purge pipe branching from the collecting pipe and selectively opening an inner part of the sacrificial fuel cell;
    a pressure gauge measuring pressure inside the sacrificial fuel cell; and
    an ampere meter measuring a current amount occurring from the sacrificial fuel cell at one side of the exhauster.

2. The system of claim 1, wherein the means for exhausting re-circulates unreacted material passed through the sacrificial fuel cell into the sacrificial fuel cell.

3. The system of claim 1, further comprising, at one side of the collecting pipe, a water collecting part to store water dispensed from the sacrificial fuel cell.

4. The system of claim 1, wherein the means for regenerating changes a flowing velocity of the unreacted material discharged from the main fuel cell to discharge moisture and impurities inside the main fuel cell through the purge pipe.

5. The system of claim 1, further comprising, at one side of the collecting pipe, a collecting pump to force the unreacted material flowing inside the sacrificial fuel cell.

6. The system of claim 5, wherein the collecting pump operates when the main fuel cell and the inner part of the sacrificial fuel cell are cut off from each other.

7. The system of claim 1, wherein the purge pipe selectively opens up in a case where pressure inside the sacrificial fuel cell measured by a pressure gauge is higher than a set pressure.

8. The system of claim 1, wherein the purge pipe selectively opens up when the current occurring in the sacrificial fuel cell approaches '0' and pressure inside the sacrificial fuel cell is increasing.

9. The system of claim 1, wherein the means for recirculating includes:
  a gas-liquid separator separating water from the unreacted material discharged from the main fuel cell;
  a recirculating pipe guiding the unreacted material free of water from the gas-liquid separator into the main fuel cell; and
  a recirculating pump forcing the unreacted material flowing inside the recirculating pipe.

* * * * *